Figure 1:
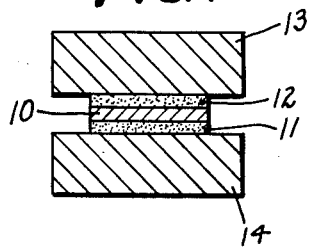

Nov. 25, 1952  P. ROBINSON  2,619,443
METHOD OF MAKING ELECTRICAL CONDENSERS
Filed April 8, 1948

PRESTON ROBINSON
INVENTOR.
BY

Patented Nov. 25, 1952

2,619,443

UNITED STATES PATENT OFFICE 2,619,443

METHOD OF MAKING ELECTRICAL CONDENSERS

Preston Robinson, Williamstown, Mass., assignor to Sprague Electric Company, North Adams, Mass., a corporation of Massachusetts Application April 8, 1948, Serial No. 19,799

1 Claim. (Cl. 154—80)

My present invention relates to improved electrical condensers. More particularly, it concerns metal foil condensers having ample insulation over the foil edges, and the process whereby such insulation is formed.

There are numerous applications in the communications and other industries in which low capacity condensers are required for conpensating, balancing tuned circuits, by-passing high frequencies and the like. For such applications one generally employs molded mica condensers, tubular ceramic condensers and the like. All of the low capacity condensers employed at present are relatively expensive, when the cost per microfarad is considered, and further, a 50 micromicrofarad condenser costs about as much as a 100 or even a 200 microfarad condenser, due to the amount of labor required and the only slight difference in material costs.

One proposal designed to overcome the cost unbalance indicated above has been to coat large sheets of metal foil with a lacquer or other insulating coating, and then to punch small condenser electrodes from the large insulated foils. Small electrode foils of this type are then stacked together to make the condenser of proper capacity. Unfortunately, however, such punched electrode foils suffer from the disadvantage that their edges, where the dielectric field strength is the highest, are not coated, so that the possibility of breakdown between adjacent edges of the stacked foils is pronounced. Even if uninsulated foils are punched and then dipped in lacquer, their edges are not adequately insulated, because the lacquer solution tends to pull away from the edges, probably due to surface tension effects.

It is an object of this present invention to overcome the foregoing and related disadvantages. A further object is to produce novel, low capacity condensers by simple and inexpensive means. A still further object is to produce stacked condensers useful in a wide variety of applications. A still further object is to provide a simple and effective process for producing small punched electrodes with adequate surface and edge insulation. Another object is to produce conductors with extremely thin, uniform insulation.

According to my invention, these objects are attained by forming an electrical condenser comprising metal electrode foils separated from each other by an insulating filling of ceramic material and thermoplastic binder, said filling being extended beyond the edges of said metal foils by subjection to a pressure and temperature at which the filling flows more readily than the metal.

In a more restricted sense, the invention is concerned with a stacked electrical condenser comprising superimposed metal electrode foils, at least alternate foils of which are coated with a dielectric consisting of particles of a ceramic material and a thermoplastic binder, said dielectric being extended beyond the edges of said foils by subjection to a pressure and temperature at which the dielectric flows more readily than the metal. In one of its specific embodiments, the invention is concerned with a stacked electrical condenser comprising superimposed punched metal electrode foils, alternate foils being coated with a dielectric filling consisting of a substantial percentage of ceramic particles and a substantial percentage of a polytetrahaloethylene resin, the filling being extended beyond the edges of said metal foils by subjection of the punched sections of the stack to a pressure and temperature at which the filling flows more readily than the metal.

The invention is also concerned with a process for producing extremely thin insulated conductors which comprises providing a conductor with a thin integrally bonded insulation layer whose inner mass predominates in ceramic particles and whose outer mass predominates in fused particles of a polytetrahaloethylene resin, and subjecting said conductor to a temperature and pressure at least equal to the yield point of the conductor and below the yield point of the bond between the conductor and the insulation.

I have discovered that the combination of a ceramic material and suitable thermoplastic binder possesses properties which makes it ideally suited to my new process for producing edge-insulated, punched electrode foils. The dielectric layer initially applied to the large sheet of metal foil, consists of a substantial proportion of ceramic particles and a substantial proportion of a thermoplastic resin binder, these two ingredients being intimately and homogeneously combined therein. This layer may be deposited on the foil by electrophoretic means or, alternatively, by dipping the foil in an appropriate suspension of particles of ceramic and binder materials. The so insulated sheet of metal foil is then punched into electrodes of the desired size and shape and, according to my invention, such electrodes are thereafter subjected to a range of temperatures and pressures within which the metal electrode foil will not flow appreciably while the dielectric layer will flow, thus forcing the latter over the edges of the electrode and adequately insulating such edges. The so processed electrodes may be incorporated within a stacked condenser assembly, which for simplicity I will hereinafter refer to as a "sandwich," it being understood that even two superimposed electrodes comprise a sandwich. According to another embodiment of my invention, the sandwich may be made up of superimposed punched electrode foils, at least every other one of which is insulated as described above, and the whole assembly or sandwich then subjected to the pressure and temperature required to bring about the edge insulating effect of the invention.

It is obvious that the above procedure is particularly advantageous for very low voltage and low capacity assemblies, but it is also applicable to other types of condenser structures, e. g. rolled and wound condensers, high voltage condensers, trimmer condenser plates, etc.

Further, I have discovered that extremely thin insulated foils and other conductors may be produced by subjection of the conductor, insulated as described herein, at least to the temperature and pressure corresponding to the yield point of the conductor but below the temperature and pressure of the yield point of the bond between the conductor and the insulation. That is, the bond between the conductor and the insulation possesses a yield point greater than that of the metal, and is therefore stronger under these conditions; thus the metal and the insulation will flow uniformly and be reduced in thickness, without disrupting the bond, even if the rate of flow of the metal and the insulation taken separately were dissimilar. One outstanding example is where the conductor is initially provided with insulation consisting of an inner layer predominating in ceramic particles integrally bonded to the conductor and an outer or surface layer predominating in fused polytetrahaloethylene resin particles, as this insulation possesses a conductor-insulation bond of the desired strength and yield point. By this procedure, it is possible to obtain uniform films of insulation and conductor, with the insulation being in the neighborhood of .0001" thick.

Figure 2:
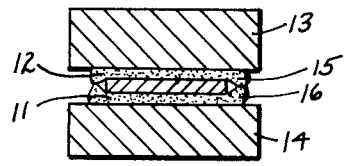
Figure 6:
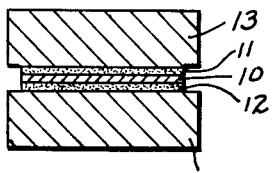
Figure 3:
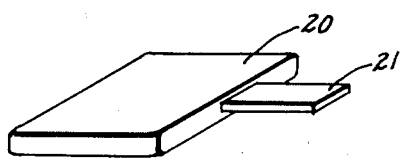
Figure 4:
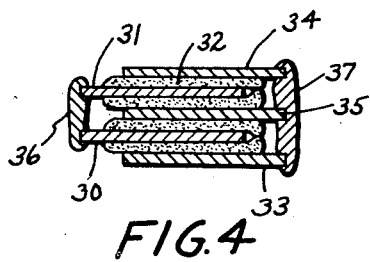
Figure 5:

The invention will be further described with reference to the appended drawing, in which Figure 1 shows the cross-section of an insulated electrode foil prior to the treatment described herein, Figure 2 shows a cross-section of the fully insulated electrode foil following the treatment, Figure 3 shows a perspective view of a completed electrode foil having a terminal tab, Figure 4 shows a cross-section of a stacked condenser employing several insulated electrode foils according to the invention, Figure 5 shows a cross-section of a unit condenser produced in accordance with another embodiment of the invention, and Figure 6 shows a cross-section of another insulated electrode foil after another of the treatments described herein.

Referring more specifically to Figure 1, 10 represents the conductor, generally a metal foil. 11 and 12 represent dielectric layers deposited on the electrode foil 10 by electrophoresis, dipping, spraying or by other known means. Layers 11 and 12 preferably consist of a mixture of ceramic particles and a thermoplastic resin binder. The specific materials and methods for depositing them will be discussed in detail in later paragraphs. The coated foil 10 is placed between platens or rolls 13 and 14. These platens or rolls are preferably heated by some means, so that the coated foil will be brought to the proper temperature. If so desired, the atmosphere may be heated to supplement the platen or roll heat.

Figure 2 shows a cross-section of the coated foil, after pressure and heat have been applied in the proper relationship. The electrode foil 10 is now insulated at the edges, as indicated by insulation 15 and 16, which has flowed over the exposed edge of the foil under the processing conditions. As heretofore mentioned, the pressure and temperature used are such that the insulation will flow without the concurrent deformation of the metal conductor. With proper control, the edges of layers 12 and 13 will bond together at the interface therebetween.

Figure 3 shows a finished, insulated electrode foil 20 with a terminal tab 21 extending therefrom. An insulated foil of this type can be produced by punching a coated foil in the shape of a paddle, the handle being the terminal section. The punched shape is then passed through a heated rolling mill or pressed between heated platens to insulate all edges of the structure. Thereafter the terminal tab is treated by scraping or, with a solvent, etc., to remove the insulation therefrom.

Figure 4 shows a condenser produced by stacking two of the electrode units shown in Figure 3 with three uninsulated foils. 30 and 31 represent electrode foils insulated by dielectric material 32, in accordance with the invention. Electrode foils 33, 34 and 35 are alternately stacked with electrodes 30 and 31, one edge of each of these foils extending beyond the stack, in the usual manner. The individual foils 30 and 31, and 33, 34 and 35 are interconnected by means of low resistance shunts 36 and 37, respectively. These shunts are generally composed of solder. Alternately, the extended foils may be pressed together and then clamped or riveted to terminal elements.

The stacked assembly referred to above may be encased in an insulating sheath, if so desired. For example, the condenser may have a molded casing, using a condensation or polymerization resin, the molding temperatures and pressures generally being below the range required for the foil insulation treatment.

Figure 5 shows a cross-section of a unitary, small volume, low capacity condenser. 40 represents an electrode foil with dielectric 41 insulating the electrode except at the terminal portion. It may be prepared as described in connection with Figure 3. 42 represents a metal coating on the dielectric layer 41. This metal coating, which serves as the other electrode of the condenser, should be united to or should rest closely against dielectric 41 for optimum efficiency. Air spaces and bubbles are undesirable. The metal coating may be applied by die-casting, spraying, sublimation, chemical silvering followed by electroplating, or by other means. In accordance with one embodiment of the invention, the metal is sprayed in particles which, when they impinge upon the dielectric, are at a temperature corresponding to the softening temperature of the thermoplastic binder in the dielectric. By this procedure, a firmly bonded outer electrode can be produced.

The condenser illustrated in Figure 5 is characterized by good stability under adverse conditions and good electrical properties, especially at high frequencies and when the terminal to electrode 42 is near the terminal of electrode 40.

If so desired, a special, high frequency condenser of the feed-through type may be produced by punching from a large metal sheet coated with a dielectric material composed of ceramic particles and a thermoplastic resin binder, a plurality of small electrode foils having two terminal sections at opposite ends. The dielectric material is then flowed around the edges of the electrode foils in accordance with the invention, and the central portion of each electrode foil is provided with an outer electrode layer, as described above. The two terminals to the inner electrode serve as input and output terminals, while the outside electrode layer is generally grounded or connected to the chassis. The impedance of this condenser will be low over a wide band of frequencies, the band depending upon the capacity and physical dimensions of the condenser.

Referring now to Figure 6, if it is desired to produce a relatively thin dielectric layer on a relatively thin electrode foil, it is possible to subject a coated metal foil, such as 10, to a temperature and pressure at which the rate of flow of the metal is approximately the same as that of the dielectric material. This range of conditions encompasses, as a general rule, higher pressures and/or temperatures than those required for the edge insulation step. However, the most important feature as described earlier, is that the bond between the foil and the insulation have a higher yield point than that of the conductor itself. For this reason, particular care must be used in selecting the proper type of insulation. An example of this is given in later paragraphs. By this method, the lateral dimensions are uniformly increased and the thickness dimension uniformly decreased. The process is of particular value in the fabrication of very thin dielectric films on very thin conductors, which cannot be handled and produced by conventional methods, due to fragility, etc. It is contemplated that very thin wires, as well as sheets may be produced in this manner.

The types of conductors that may be insulated in accordance with the invention are numerous. For example, copper, aluminum, nickel, lead, tin and various alloys may be so treated. The particular metal may be selected on the basis of its electrical characteristics, plastic flow characteristics or some other characteristic essential for the intended application. The metal must naturally be able to withstand the processing conditions without melting, embrittlement, etc. For metal foils which are themselves to be reduced, it is often advantageous to employ the softer metals, e. g. lead, tin and zinc and their alloys, but copper and aluminum are satisfactory if the insulation metal bond strength is sufficiently high.

The dielectric layer may be produced on the conductor by a variety of means, such as electrodeposition, dipping, spraying and the like. Preferably the layer is formed by electrophoretic deposition of particles of ceramic material and of a thermoplastic resin binder. Such layers are characterized by good flexibility and satisfactory bonding to the underlying conductors. Processes for such depositions are described in detail in the references given below. For codeposition of resin particles and ceramic particles, reference should be made to the U. S. Patent 2,386,634, issued on October 9, 1945 to P. Robinson et al. and to the pending patent application S. N. 767,740, filed on August 9, 1947 by Stanley O. Dorst. For electrophoretic deposition of ceramic particles followed by impregnation of the pores thereof with thermoplastic material, reference may be made to the U. S. Patent 2,421,652, issued on June 3, 1947 to P. Robinson et al. and to the copending patent applications, S. N. 697,772, filed on September 18, 1946 by Robinson et al., now Patent No. 2,478,322, dated August 9, 1949, and S. N. 536,448 filed on May 20, 1944 by S. O. Dorst now Patent No. 2,495,632, dated January 24, 1950.

Among the ceramic materials which may be utilized in accordance with the invention are talc, china clay, zinc oxide, titanium dioxide, alkaline earth titanates, ground mica, bentonite, etc. For applications in which a high dielectric constant is required, titanium dioxide and the alkaline earth titanates are recommended as ceramic filling materials. A particle size of approximately 0.5 to 10.0 microns has been found to be quite satisfactory. Particle sizes less than 4.0 microns are preferred as a general rule.

The resin is preferably a thermoplastic material possessing a softening or flow point above the maximum operational temperature of the condenser. For moderate temperature applications, polystyrene, polyethylene, polyamides, polyisocyanates, butyl rubber and other thermoplastic resin binders are useful. For higher temperature applications, polypentachlorostyrene, polysiloxanes, and the like are useful. For optimum, high temperature condensers, polymers and copolymers of tetrafluoroethylene, tetrachloroethylene, and chlorotrifluoroethylene are especially valuable.

The dielectric layer should consist of a uniform mixture of resin particles and ceramic particles, the resin particles being fused together, if so desired. Such a uniform coating may be achieved by either the codeposition process or the two-step deposition process referred to above. The ratio of resin to ceramic particles should be between about 1 to 10 and 5 to 1. Preferably the ratio is between about 1 to 1 and 1 to 3.

The range of temperature and pressure required to cause the flowing of the dielectric filling depends, of course, upon the particular resin constituent and its concentration in the dielectric material. As a general rule, the temperature should be from about 70° C. to about 350° C., and the pressure should be between about 1000 pounds per square inch and 1,000,000 pounds per square inch. In the case of the fully halogenated ethylene resins, the temperature is preferably between about 100° C. and 300° C., and the pressure between about 1000 pounds per square inch and 100,000 pounds per square inch.

In the case of silicone resins, polyvinyl aromatic resins, and other resins possessing relatively low softening points, the temperature is preferably between about 70° C. and 150° C., and the pressure between about 500 pounds per square inch and 50,000 pounds per square inch.

If it is desired to elongate both the conductor and the insulation as described in connection with Figure 6, the insulation preferably consists of an inner ceramic layer and an outer impervious polytetrahaloethylene resin. This combination is described in detail in copending application bearing S. N. 767,740, filed on August 9, 1947 by Stanley O. Dorst. The insulation described therein is remarkably tough and durable and will withstand extremely high temperatures without deterioration. For the purposes of the present invention the conductor should initially be provided with a ceramic base layer which is somewhat porous in nature. This initial layer generally consists of a predominant amount of the electrophoretic anodic deposition products of talc, china clay, zinc oxide, titanium dioxide and the like and a minor amount of the electrolytic anodic deposition product of a soluble silicate. The latter deposits as a hydrated polysilicic acid and aids in the securing of the firm bond necessary in the practice of this embodiment of the invention. The pores of the so-prepared layer may be impregnated with a hydrated aluminum oxide or with polytetrahaloethylene resin particles. The base layer is provided with an impervious top coating of polytetrahaloethylene resin, preferably by dipping the conductor in a suspension of resin particles and subsequently fusing them together. The thickness of the resin layer is generally and preferably less than that of the ceramic layer and the overall thickness of the insulation is generally between .001" and about .00001". Conductors insulated in accordance with the above instructions are particularly adapted to the process described in connection with Figure 6. The insulation will stand the temperatures and pressures required for this process.

For the practice of the embodiment discussed in the previous paragraph and in connection with Figure 6, the pressure is preferably between about 2000 pounds per square inch and about 500,000 pounds per square inch and the temperature should be between about 125° C. and 350° C.

While the invention has been particularly directed to flat or elongated sheets, it is also applicable to other forms and shapes of conductors, such as those of circular cross-section. In the case of insulated wires and the like, it is generally advisable to draw the coated conductor through reducing dies to obtain a uniform dielectric reduction throughout the cross-section. In such applications the conductor is generally also reduced in diameter. It is further desirable to place by extrusion or other means, an outer sheath on the dielectric layer, to insure a uniform reduction and at the same time to produce a coaxial conductor useful as a transmission line or as a condenser element. In connection with the embodiment described in Figure 6, it becomes possible for the first time to produce extremely fine insulated conductors. Many metals are too fragile to be drawn down into very fine diameters, such as .0001". Because of their fragility in fine diameters, it is impossible to insulate them by continuous methods. According to the present invention the insulation may be applied in a relatively thick layer to a relatively large diameter wire and the two may then be drawn down to the very fine diameter desired.

The invention has been directed particularly to the treatment of individual electrode foils. However, with proper processing equipment it is possible to stack or roll a condenser section and heat and press the aggregate assembly in accordance with the teachings herein, to obtain the same novel effect.

As many apparently widely different embodiments of this invention may be made without departing from the spirit and scope hereof, it is to be understood that the invention is not limited to the specific embodiments hereof except as defined in the appended claim.

I claim:

A process for preparing an edge-insulated metal electrode foil which comprises applying a layer of dielectric material more than 0.0001" thick to both sides of a metal foil, said dielectric material consisting of finely divided ceramic material and polytetrafluoroethylene resin binder, in a ratio between about 1 to 1 and 1 to 3 and then extending the dielectric material beyond the edges of said metal foil by subjecting it to a temperature between about 125° C. and 350° C. and a pressure between about 2000 p. s. i. and 500,000 p. s. i. at which said dielectric material flows more readily than the metal and is reduced to a thickness of not less than 0.0001 inch.

PRESTON ROBINSON.

REFERENCES CITED

The following references are of record in the file of this patent:

UNITED STATES PATENTS

| Number | Name | Date |
|---|---|---|
| 2,086,165 | Kronquest | July 6, 1937 |
| 2,238,031 | Brennan | Apr. 15, 1941 |
| 2,386,634 | Robinson | Oct. 9, 1945 |
| 2,387,759 | Jarvis | Oct. 30, 1945 |
| 2,421,652 | Robinson | June 3, 1947 |
| 2,424,853 | Safford | July 29, 1947 |
| 2,427,183 | Berry | Sept. 9, 1947 |
| 2,446,928 | Hodgdon | Aug. 10, 1948 |
| 2,449,952 | Pridham | Sept. 21, 1948 |